United States Patent [19]

Liu

[11] Patent Number: 5,701,785
[45] Date of Patent: Dec. 30, 1997

[54] DRIVING STRUCTURE OF THE EXTERNAL ROTARY DISK OF THE CRYSTAL BALL

[76] Inventor: Jack Liu, No. 3, Alley 202, Kao-Fon Rd., Hsin-Chu City, Taiwan

[21] Appl. No.: 611,669

[22] Filed: Mar. 6, 1996

[51] Int. Cl.$^6$ ............... F16H 1/20; F16D 11/16; F03G 1/08

[52] U.S. Cl. ............ 74/421 R; 74/577 M; 185/39; 192/46; 40/430

[58] Field of Search ............ 74/421 R, 577 M; 192/46; 185/39; 40/406, 410, 430; 84/94.1

[56] References Cited

U.S. PATENT DOCUMENTS

| | | | |
|---|---|---|---|
| 2,305,666 | 12/1942 | Bolsey | 185/39 |
| 4,401,006 | 8/1983 | Sekiguchi | 192/46 |
| 5,000,721 | 3/1991 | Williams | 192/46 |
| 5,070,633 | 12/1991 | Lice | 74/63 |

*Primary Examiner*—Charles A. Marmor
*Assistant Examiner*—Sherry Lynn Estremsky
*Attorney, Agent, or Firm*—Beveridge, DeGrandi, Weilacher & Young, LLP

[57] ABSTRACT

The present invention is related to a driving structure of the external rotary disk of the crystal ball the inner rim the external rotary disk of which is provided with two set of gears which is engaged with the external rotary disk. The diameters of center gear for each set of the gears are different with each other, wherein the center gears are formed an unidirectional device with the axle of the spring. Therefore, the external rotary disk is driven by the dynamic force of the spring of the music box through one of the gears sets, on the contrary, the external rotary disk can be rotated with a preset direction, thus the other gear set will be driven to rapidly tightly wind the spring of the music box.

8 Claims, 5 Drawing Sheets

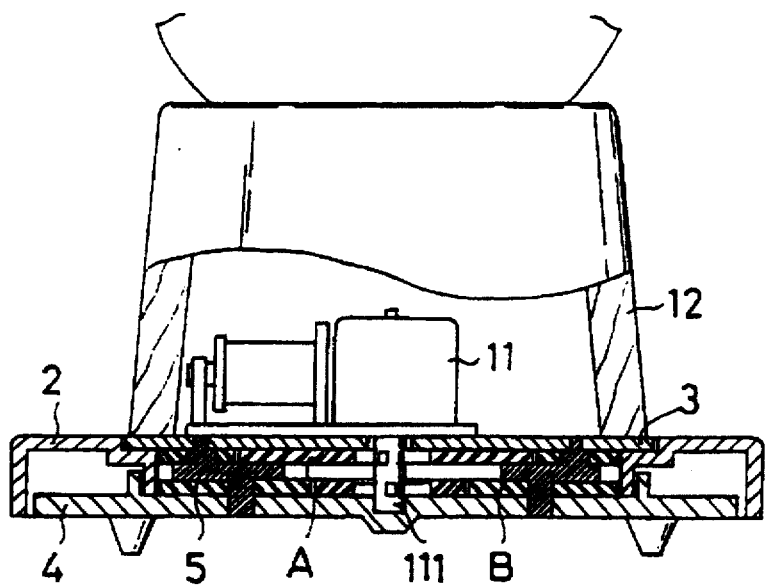
FIG.3
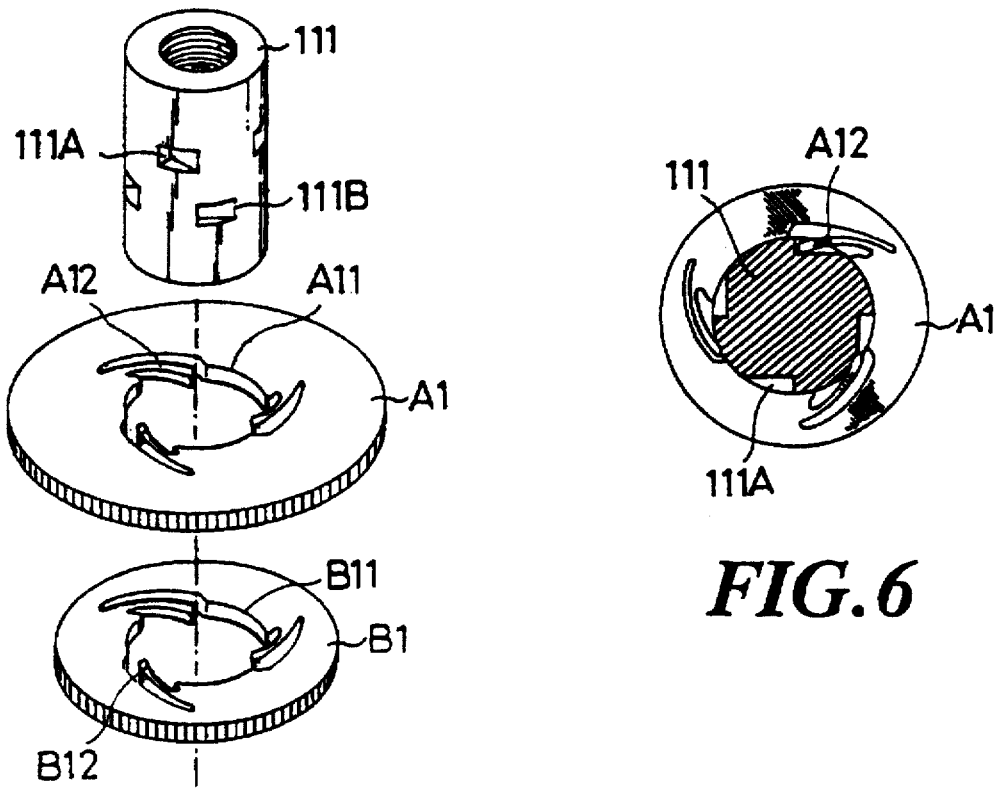
FIG.5
FIG.6

DRIVING STRUCTURE OF THE EXTERNAL ROTARY DISK OF THE CRYSTAL BALL

BACKGROUND OF THE INVENTION

The present invention is related to a driving structure of the external rotary disk of the crystal ball, especially, to a crystal ball the external rotary disk of which is driven by the dynamic power of the spring of a music box, and when the external rotary disk is rotated by the inversely applied force, the external rotary disk is driven rapidly to tightly wind the spring of the music box.

DESCRIPTION OF THE PRIOR ART

Generally, in the conventional decorative article of the crystal ball, the music box is rotated under the base of the bottom of the crystal, so the operator winds the spring of the music box through the rotary button on the lower pan thereof.

In the process for tightly winding said spring, the operator must take up the crystal ball for conveniently operating the rotary button. Therefore, if the crystal ball is heavier for its large volume, the crystal ball is inconvenient to operate and is usually slid to the ground for loosing from the hand.

Moreover, in the music box of the conventional crystal ball, the number of rotating circles of the rotary button for tightly the spring is approximately equal to the inverse rotating circles for releasing the dynamic force of the spring, that is to say, the operator must take much time to rotate the rotary button for only three to five circles.

SUMMARY OF THE INVENTION

Accordingly, the object of the present invention is to provide a driving structure of the external rotary disk of the crystal ball the inner rim of the external rotary disk of which is provided with two set of gears which are engaged with the external rotary disk.

The diameters of center gear for each set of the gears are different with each other and wherein the center gears are formed an unidirectional devices with the axle of the spring.

Therefore, the external rotary disk is driven by the dynamic force of the spring of the music box through one of the gears sets, so that the crystal ball can present an external dynamic phenomenon. Furthermore, under the condition that the operator does not take up the external rotary disk, the external rotary disk is rotated in a preset direction, thus the other gear set will be driven in order to rapidly tightly wind the spring of the music box.

DESCRIPTION OF THE DRAWINGS

FIG. 3 is the front sectional view of FIG. 1.

FIG. 5 is the cubic assembly view of the unidirectional control device formed by the spring axle and the center gear.

FIG. 6 is the top view of FIG. 5, which shows the assembly relation between the unidirectional gear and the elastic piece of the center gear.

DESCRIPTION OF THE PREFERRED EMBODIMENT

Figure 1:
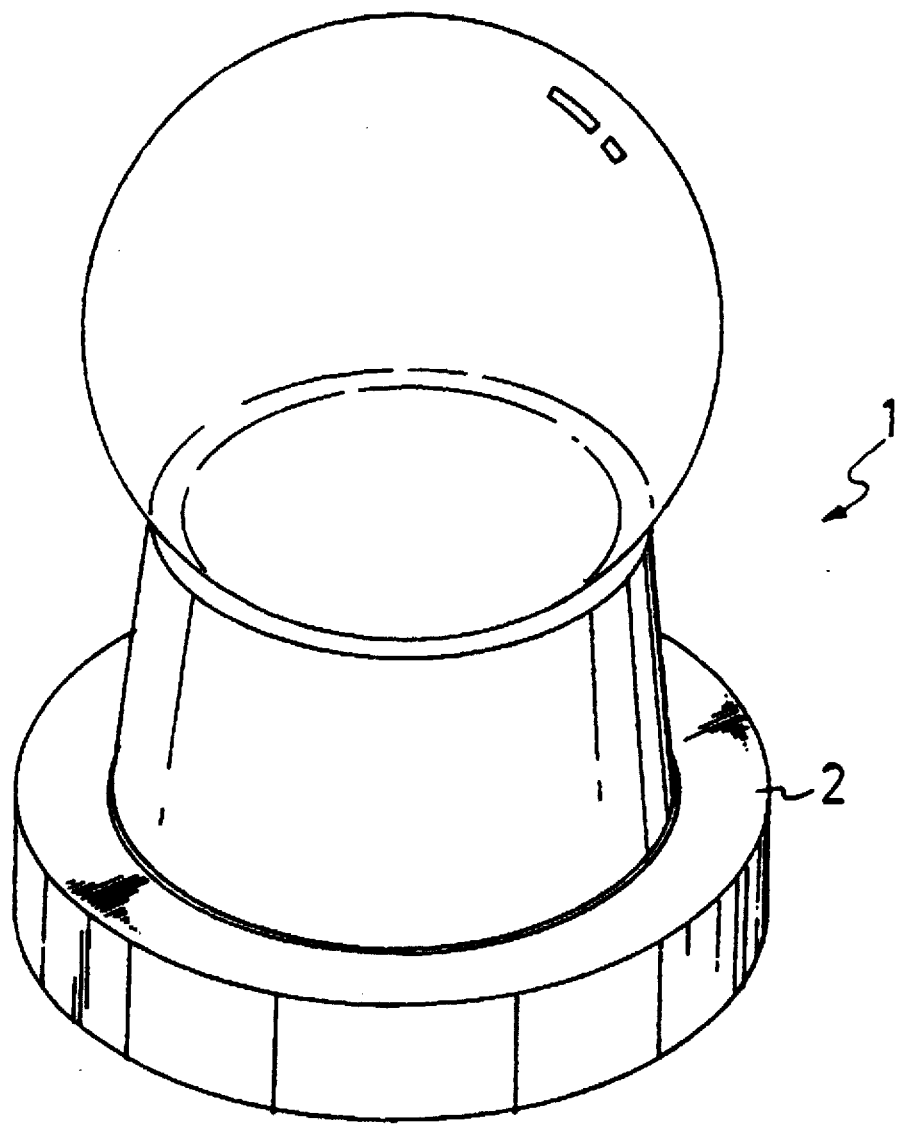
FIG. 1 is a three dimensional outer appearance of the crystal ball of the present invention.

Referring to the FIG. 1, the present invention is related to a crystal ball with an external rotary disk. The upper crystal ball (1) is fixed and the external rotary disk (2) positioned below the periphery of the crystal ball (1) present a rotation phenomenon.

Figure 2:
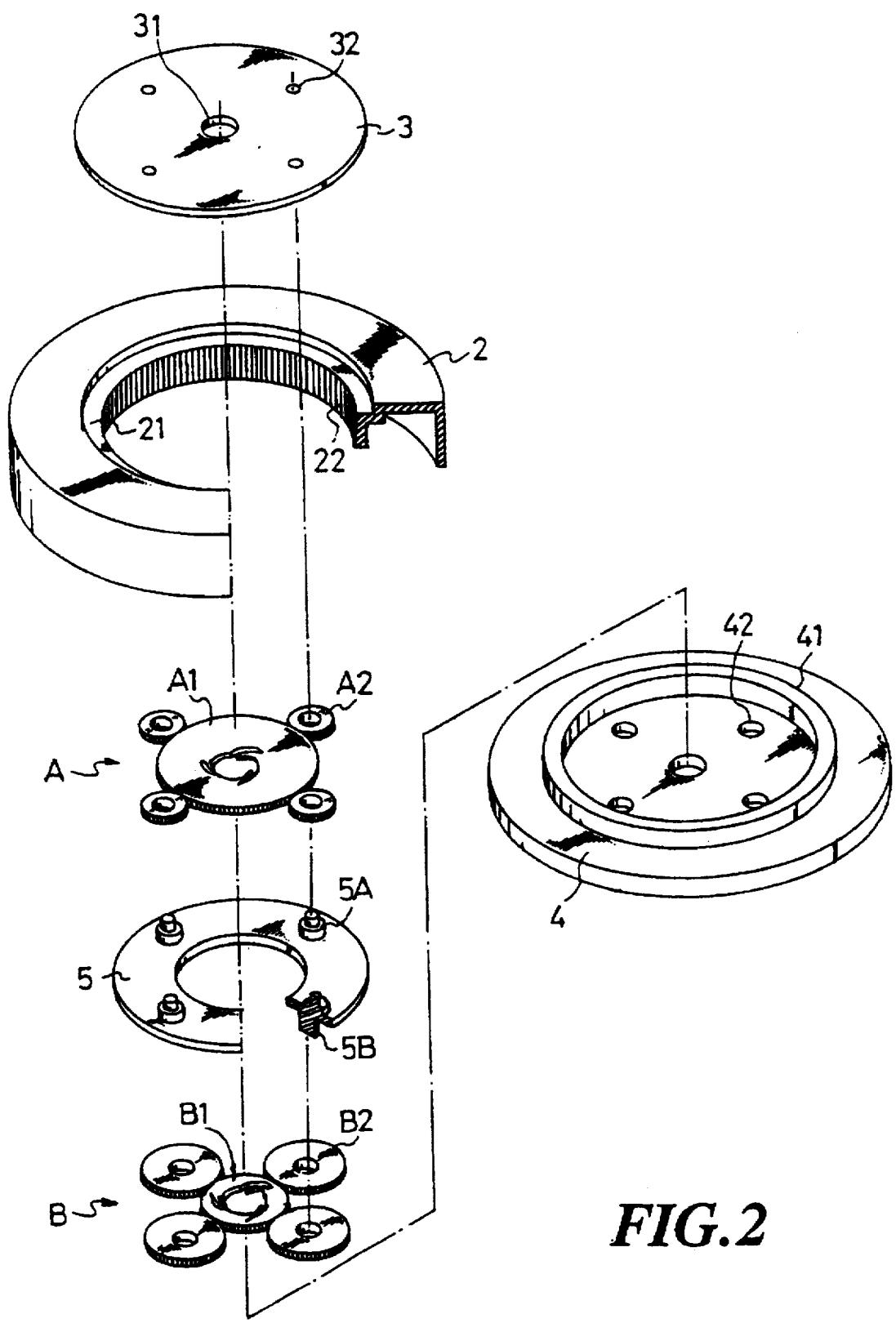
FIG. 2 is a cubic assembly view of the inner part of the external rotary disk of FIG 1.

The cross section of said external rotary disk is a circular element of "U" shape, as shown in FIGS. 2 and 3. Circular teeth (22) are formed on the wall surface of the inner rim of the external rotary disk (2), and the concave part (23) of the container substrate (3) formed on the upper disk surface of the external rotary disk (2), said base is provided to the music box (11) and the wood base (12) of the crystal ball. A penetrated hole through the external rotary disk downward for providing the spring axle (111) of the music box (11) is installed on the center of the substrate (3).

Moreover, a base (4) is installed below the external rotary disk (2), a projected ring (41) on the one inside of the "U" shape cross section of the external rotary disk (2) is installed on the disk surface of the base (4).

Furthermore, the inner rim of the external rotary disk (2) between the base (4) and substrate (3) is installed with a circular pedestal (5) the upper end face and the lower end face of which are installed with a plurality of axial positioning axles (5A, 5B), wherein the positioning axle 5B is corresponding to the positioning hole (42) of the disk face of the base (4) so that the pedestal (5) is supported and spaced a fixed distance above the base (4) and a set of gears (B) is mounted therebetween. Furthermore, said positioning axle (5A) of said pedestal (5) is adhered on the positioning hole (32) corresponding to the substrate (3) so that the substrate (3) is supported by the positioning axle (5A) and is retained a proper gap with the disk surface of the pedestal (5).

Figure 4:
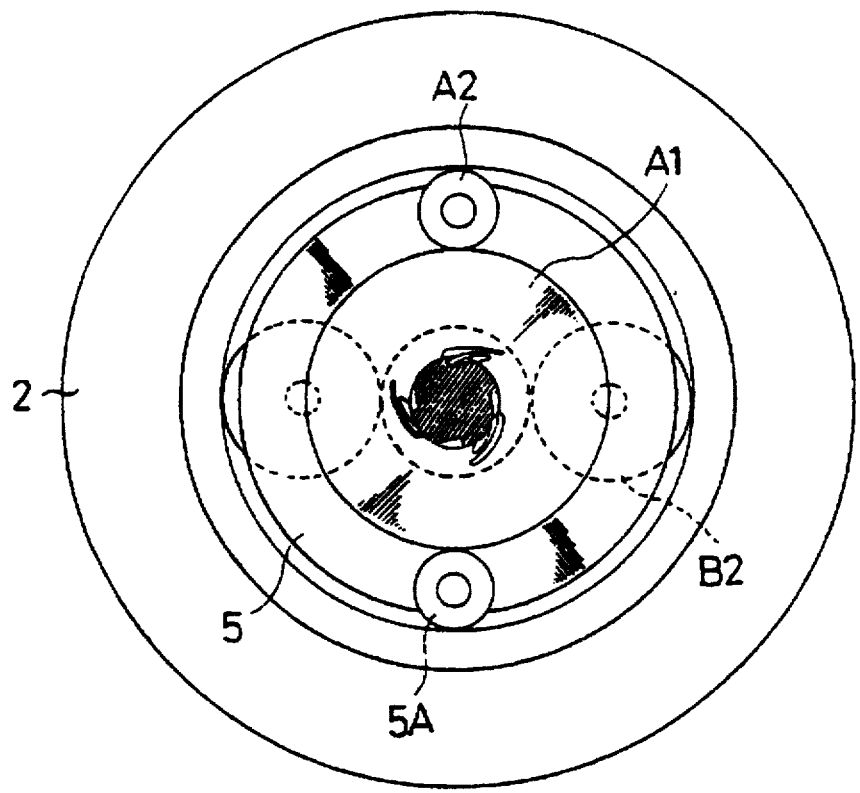
FIG. 4 is a top view shown the assembly relation between the gear set and the external rotary disk.

The gears set (A) contains a center gear (A1) and a plurality of driven gears (A2) on the periphery of the center gear (A1). Said driven gear (A2) is mounted around the positioning axle (5A) of the upper end face of the pedestal (5) and is engaged with center gear (A1) and circular teeth (22) of the external rotary disk (2), therefore, the rotation of the center gear (A1) will drive the driven gear (A2) to spin around the positioning axle (5A), then the external rotary disk is driven to rotate synchronously, as shown in FIG. 4.

The gears set (B) contains a center gear (B1) and a plurality of driven gears (B2) on the periphery of the center gear (B1). Said driven gears (B2) are mounted around the positioning axle (5B) of the bottom end face of the pedestal (5) and are engaged with center gear (B1) and circular teeth (22) of the external rotary disk (2), therefore, the rotation of the center gear (B1) will drive the driven gear (B2) to spin around the positioning axle (5B), then the external rotary disk is driven to rotate synchronously.

Moreover, a axle hole (A11) is penetrating through the center gear (A1), for receiving the spring axle (111), and on the periphery of the axle hole (A11) a plurality of unidirectional elastic pieces (A12) are formed integral with the center gear (A1). The free end of said elastic pieces (A12) is projected to the range of the axle hole (A11). There are three unidirectional elastic pieces (A12) spaced with equal angles in this embodiments, as shown in the FIG. 5. The installation of the center gear (B1) is the same as that of the center gear (A1), and the mounted directions of the spring pieces (B12) thereof are also the same as that of the spring pieces (A12) of the center gear (A1).

The spring axle (111) received through the center gear (A11, B11) and extended downward from the music box (11) is installed with a plurality of unidirectional slot (111A, 111B) which forms a unidirectional device with said elastic pieces (A12, B12) in the place with respect to the axle hole (A11, B11), as shown in the FIGS. 5 and 6. The mounting direction of the unidirectional slot (111A) is the same as that of the unidirectional slot (111B).

According to said unidirectional device, when the dynamic power of said music box (11) is released, the spring axle thereof is began to rotate according to the predetermined direction, and the unidirectional slot (111A, 111B) of the spring axle (111) can drive the center gears (A1, B1) to rotate, therefore the external rotary disk (2) is driven by the driven gears (A2, B2) to present a rotation phenomenon, thus the decorative article mounted on the external rotary disk (2) is also presented a dynamic phenomenon.

The driving condition described hereinbefore is under the condition that the ratio of gear curvatures of the two gear sets (A, B) are equal. If the diameter of the center gear (B1) is set to small than that of the center gear (A1), then when the gear sets (A, B) are driven by the spring axle (111), the rotation speed of the center gear (B1) will large than that of the center gear (A1), therefore the unidirectional device between the center gear (B1) and the spring axle (111) will fail to operate.

If during the releasing of the dynamic power of said music box (11) or after the power is released completely, the operator operates the external rotary disk (2) so that it is inversely rotated, the center gears (A1, B1) of the gear sets (A, B) are driven to inversely rotate, so that the elastic pieces (A12, B12) of the center gears (A1, B1) push the unidirectional slots (111A, 111B) of the spring axle (111), thus the spring axle (111) rotates inversely, i.e. the spring of the music box is wound tightly.

In order that the spring of the music box (11) can be tightly wound rapidly by the applied force of the external rotary disk (2), the diameter of the center gear (B1) is smaller than that of the center gear (A1).

When the external rotary disk (2) rotates, the rotary speed of the center gear (B1) is larger than that of the gear (A1), i. e., the unidirectional device between the center gear (B1) and the spring axle (111) is active, and the unidirectional device between the center gear (A1) and the spring axle (111) is inactive. If the diameter of the center gear (B1) is set to a half of that of center gear (A1), then the rotary speed of the center gear (B1) is twice of the rotary speed of the center gear (A1), thus when the force is applied to the external rotary disk, the spring will be wound rapidly.

Because the driven gears (A2, B2) of said gear sets (A, B) only provide the transfer of dynamic power between the center gears (A1, B1) and the external rotary disk (2), only one driven gears (A2, B2) used can also achieve the function, and the cost is reduced.

Moreover, the unidirectional device mounted between the center gear (A1, B1) and the spring axle (111) is not confined to the combination of the spring piece and the unidirectional slot, other type of unidirectional devices are also contained in the coverage of the present invention.

Figure 7:
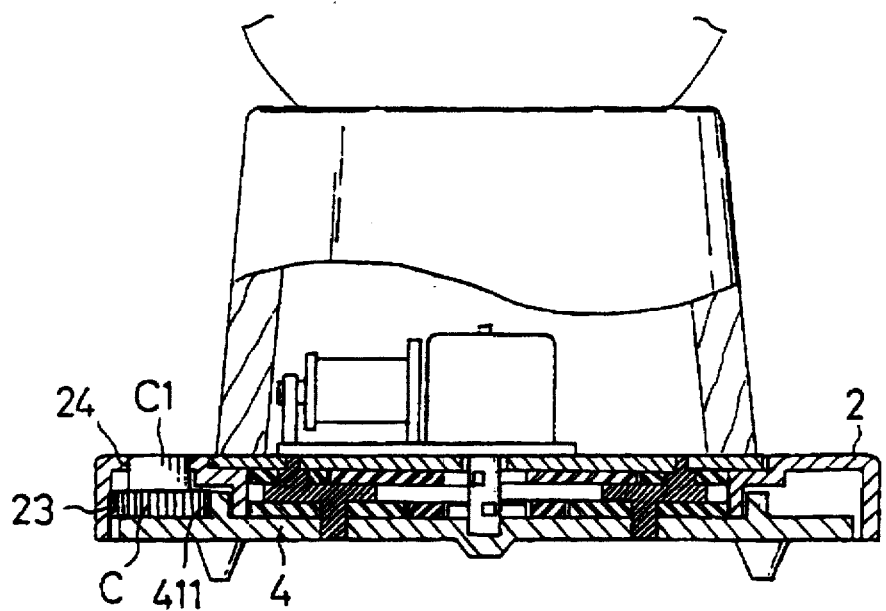
FIG. 7 shows a modified embodiment of the present invention.

In the modified embodiment shown in the FIG. 7, A gear (C) is installed on the disk surface of the base (4) inside the "U" shape cross section of the external rotary disk (2), and said gear (C) is engaged with the circular teeth (23) of one side wall surface inside the "U" shape cross section of the external rotary disk (2) and circular teeth (411) on the outer periphery of the projected ring (411) of the base, and circular convex axle (C1) extended to the disk surface circular hole (24) of the external rotary disk (2) is installed on the gear (C). When the external rotary disk (2) is driven to rotate, the circular hole (24) of the external rotary disk (2) will push the convex axle (C1) to move along the trace of the circular hole (24), so that said gear will present the actions of revolution and spin, and the decorative article installed on the upper end face will present another dynamic phenomenon.

Figure 8:
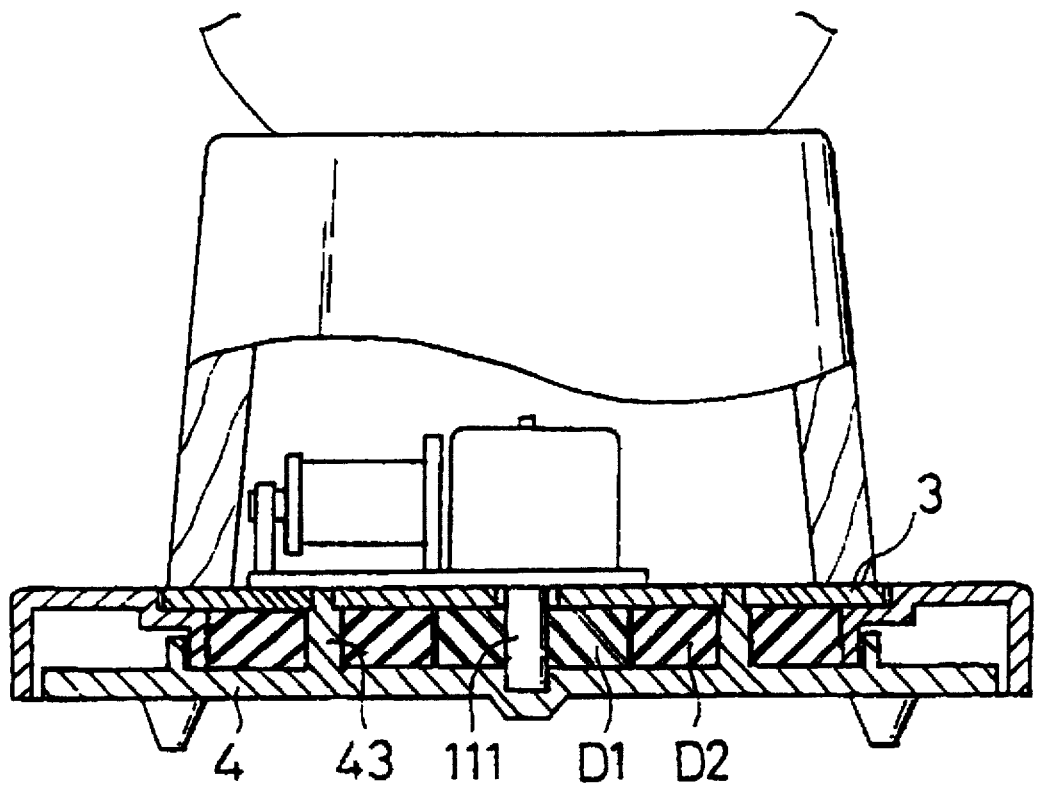
FIG. 8 shows another modified embodiment of the present invention.

The object of the present invention is to achieve the function of driving the external rotary disk to rotate, and the spring of the music box is wound rapidly by two set of gears (A, B). For the considerations of the production cost and the simplification of the structure, a set of gears can be used in the present invention to achieve the function of driving external rotary disk to rotate, as shown in the modified embodiment of FIG. 8. Because a plurality of supporting axles (43) are installed above the base (4), the supporting axles (43) other than support the base (4), at least a supporting axle (43) is engaged with a driven gear (D2) which is engaged with the center gear (D1) and the circular teeth (22) of the external rotary disk.

Said center gear is fixed on the spring axle (111) of the music box, thus the rotation of the spring axle will drive the center gear (D1) to rotate synchronously, and through the transfer of the driven gear (D2) the external rotary disk (2) is related to present the dynamic phenomenon.

Similarly, the operator can applied force to the external rotary disk to rotate inversely, and through the driven gear (D2) and the spring axle (D1) the spring axle will rotate inversely so that the object of winding the spring of the music box is achieved.

What is claimed is:

1. A driving mechanism, for a crystal ball, comprising:
    a substrate,
    a driving mechanism base,
    a pedestal,
    two sets of gears,
    a spring axle, and
    an external rotary disk
    wherein a base of said crystal ball is supported by the substrate, and the substrate is supported above the driving mechanism base by the pedestal,
    the two sets of gears are disposed between the driving mechanism base and the pedestal, and the pedestal and the substrate, respectively, and each of the two sets of gears include a center gear engaged with a driven gear, wherein the rotation center of each center gear is the spring axle and the rotation center of each driven gear is a positioning axle supported by the pedestal, each driven gear being engage with teeth defined circumferentially about an inner rim of the external rotary disk, and
    the diameter the center gears for each of the two sets of gears are different, and each of the center gears and the spring axle are engaged such that relative rotation is permitted in a single direction.

2. The driving mechanism claimed in claim 1, wherein one of the center gears having a smaller diameter is a smaller center gear for tightly winding a spring.

3. The driving mechanism claimed in claim 1, wherein the diameter of the smaller center gear is about half of the diameter of the other center gear.

4. The driving mechanism claimed in claim 1, wherein a unidirectional device is formed between each of the center gears and the spring axle, each of the unidirectional devices comprising:

a plurality of unidirectional elastic pieces disposed on a periphery of an axle hole defined through each of the center gears, each of the elastic pieces having a free end projected from the periphery of the axle hole, the spring axle being received in the axle hole of each center gear; and a plurality of unidirectional slots defined in the spring axle and positioned to co-operatively engage the unidirectional elastic pieces of each of the center gears.

5. The driving mechanism claimed in claim 1, wherein at least one driven gear is mounted on the positioning axle of the pedestal.

6. The driving mechanism claimed in claim 1, wherein a concave portion for containing the substrate is defined by an upper disk surface of the external rotary disk.

7. The driving structure claimed in claim 1, wherein the external rotary disk has a substantially "U" shape cross section and a gear is installed on the driving mechanism base inside the "U" shape cross section of the external rotary disk, the gear being engaged with a plurality of teeth defined in a side wall surface inside the "U" shape cross section of the external rotary disk and a plurality of teeth defined in an outer periphery of a projected ring of the base, and an axle extending through a hole defined in the external rotary disk is engaged with the gear.

8. A driving mechanism for an external rotary disk of a crystal ball, comprising:

a base, a pedestal;

a substrate; and two sets of gears installed between said base and said pedestal, and said pedestal and said substrate, respectively, the two sets of gears each having a center gear of different diameters.

* * * * *